United States Patent [19]
Lambert et al.

[11] Patent Number: 5,750,886
[45] Date of Patent: May 12, 1998

[54] ENGINE EMISSIONS ANALYZER WITH DIAGNOSTIC

[75] Inventors: David Kay Lambert, Sterling Heights; Peter John Groblicki, Shelby Township, Macomb County, both of Mich.

[73] Assignee: General Motors Corporation, Detroit, Mich.

[21] Appl. No.: 672,159

[22] Filed: Jun. 27, 1996

[51] Int. Cl.$^6$ .................................................. G01M 15/00
[52] U.S. Cl. ..................... 73/117.3; 73/23.31; 73/116; 60/277; 340/439; 364/431.03
[58] Field of Search .............................. 73/23.31, 23.32, 73/116, 117.2, 117.3; 60/277; 340/438, 439; 364/431.03

[56] References Cited

U.S. PATENT DOCUMENTS

| | | | |
|---|---|---|---|
| 4,928,518 | 5/1990 | Tamura | 73/117.3 |
| 5,052,361 | 10/1991 | Ono et al. | 73/23.32 |
| 5,263,358 | 11/1993 | Center et al. | 73/23.32 |
| 5,417,099 | 5/1995 | Ohuchi | 73/23.32 |
| 5,431,042 | 7/1995 | Lambert et al. | 73/116 |
| 5,535,135 | 7/1996 | Bush et al. | 73/23.32 |

*Primary Examiner*—George M. Dombroske
*Attorney, Agent, or Firm*—Michael J. Bridges

[57] ABSTRACT

A method for analyzing automotive vehicle emissions detects and logs significant engine events over a test period, and applies the logged events to a model defining the emissions impact of such events to yield a vehicle emissions estimate for the test period. The method includes a diagnostic for diagnosing a deviation in performance of emissions control systems away from an expected performance and for correcting the vehicle emissions estimated to reflect the operating condition of the emissions control systems.

13 Claims, 3 Drawing Sheets

ENGINE EMISSIONS ANALYZER WITH DIAGNOSTIC

FIELD OF THE INVENTION

This invention relates to automotive vehicle emissions control and, more particularly, to emissions monitoring of automotive vehicles.

BACKGROUND OF THE INVENTION

A significant effort has been made to reduce automotive vehicle emissions, including the constituent emissions elements of carbon monoxide, hydrocarbons and oxides of nitrogen. Various automotive emissions control systems have been proposed to reduce automotive vehicle emissions. Further, diagnostics are commonly available on-board automotive vehicles for diagnosing the performance of the emissions control systems to support timely treatment of faulty emissions control systems to maintain a prescribed low vehicle emissions level over time. The diagnostics may indicate when a fault condition is present in an emissions control system on a vehicle, the degree of severity of the fault condition and the specific emissions control system that is faulty. Upon receiving such indication, the vehicle operator is requested to submit the vehicle for service. Any delay in servicing the indicated condition can result in an increase in emissions to the atmosphere.

U.S. Pat. No. 5,431,042, assigned to the assignee of this application, describes monitoring vehicle emissions and indicating emissions levels to a vehicle operator to encourage driving behavior consistent with efficient operation of vehicle emissions control systems. The cost and durability concerns associated with placing new emissions sensing hardware in the harsh environment of the engine exhaust gas path to directly sense and report emissions levels is overcome in such patented approach through indirect estimation of vehicle emissions levels. Such patented approach does not contemplate emissions control systems fault conditions. As such, if such a fault condition is present, modeling error may be present or may increase in such patented system, which may negatively affect the accuracy of the indicated emissions levels. It would be desirable to reduce such error so that accurate emissions information may be determined, indicated and provided to an external analyzer, and so that the vehicle operator will be given an appropriate incentive to submit the vehicle to service in a timely manner upon indication of an emissions control system fault condition.

SUMMARY OF THE INVENTION

The present invention provides a desirable vehicle emissions analyzer having a vehicle emissions model responsive to vehicle operating conditions and responsive to diagnosed fault conditions in various emissions control systems to accurately characterize vehicle emissions without the cost, complexity and durability concerns associated with direct vehicle emissions sensing.

More specifically, vehicle operating conditions affecting vehicle emissions are monitored and logged. A model is provided that is responsive to the logged conditions and that is applied to log and indicate vehicle emissions without direct emissions sensing hardware. Emissions levels of such vehicle emissions elements as CO, HC, and NOx may be logged and indicated. The model assumes the emissions control systems of the vehicle are operating at a high level of efficiency. During the logging of vehicle operating conditions, emissions control systems are monitored for fault conditions that may affect the operating efficiency thereof and thus may affect model accuracy. A fault model is included representing the change in vehicle emissions corresponding to an emissions control system fault condition. Any emissions control system fault condition that is diagnosed to be present is monitored and logged. The logged fault condition information is applied to the fault model. The nature of the fault condition may be such that a correction to the vehicle emissions estimate may be required. The fault model may return a vehicle emissions correction factor in response to the fault condition. The correction factor is applied to the vehicle emissions estimate to provide a more accurate estimate of vehicle emissions for the current operating efficiency of the vehicle emissions control systems, so that accurate emissions information may be logged or indicated, providing an incentive for servicing the fault condition.

In accord with a further aspect of this invention, the character of any diagnosed fault condition may be determined including the duration of the condition, its severity, and the specific emissions control system that is faulty. Such information may be applied to the fault model and a precise correction, if necessary, for estimated HC, CO, and NOx emissions may be provided. In accord with yet a further aspect of this invention, the analyzer is applied as an on-board unit for on-line monitoring and logging of vehicle operating conditions and fault conditions while such conditions are occurring. Emissions information may likewise be logged and indicated while the vehicle is generating such emissions or may be stored for periodic analysis and downloading to a device off-board the vehicle. The analyzer may further be portable in that it may be applied to various vehicles through a simple interface in the vehicle passenger compartment.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
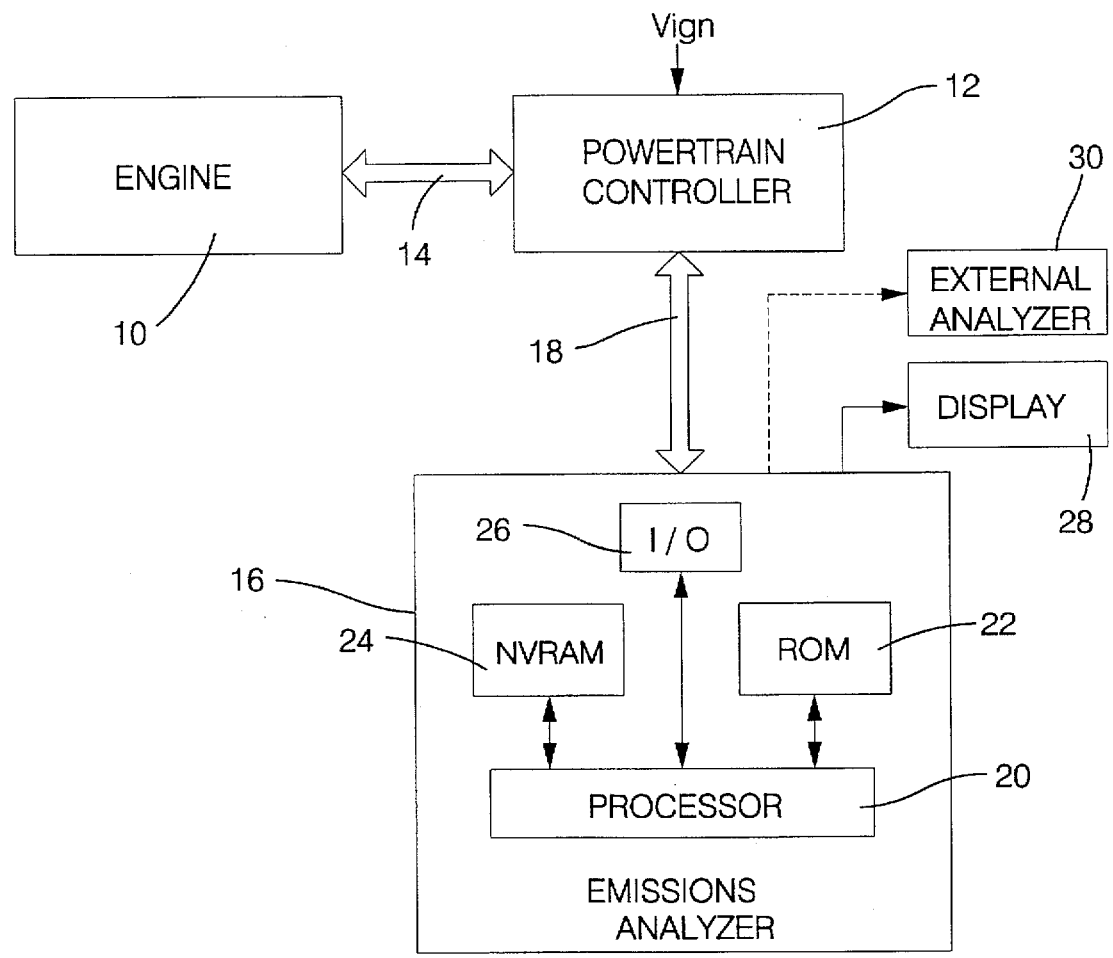
FIG. 1 is a general diagram of an engine of an automotive vehicle with emissions analyzing hardware applied to carry out the preferred embodiment of this invention.

Referring to FIG. 1, operating parameters corresponding to the operating conditions of an internal combustion engine 10 are communicated from a series of conventional engine parameter sensors (not shown) to a powertrain controller 12, which may be a conventional single-chip microcontroller as is generally known to be applied in the art for powertrain control. The powertrain controller 12 is activated in response to application of ignition power thereto, such as when an engine operator rotates an ignition switch to its "on" position. Included in the operating parameters are, for this embodiment, engine coolant temperature TEMP provided by a conventional thermocouple or thermistor in an engine coolant circulation path (not shown), engine speed RPM provided as an output signal from a conventional engine speed sensor, ambient air temperature AMBTEMP provided by a conventional thermocouple or thermistor exposed to ambient air, and engine exhaust gas oxygen content EOS provided by a conventional oxygen sensor mounted in an engine exhaust gas conduit (not shown).

When activated, the powertrain controller 12 engages in control operations including reading of the operating parameters from the described sensors and generating and issuing control commands in response thereto to various conventional powertrain control actuators (not shown). The controller 12 communicates with other external devices which, in this embodiment, include emissions analyzer 16 having a single chip microcontroller comprised of the generally-known constituent elements of a processor 20, read only memory ROM 22, non-volatile random access memory NVRAM 24, and an input/output unit I/O 26. The emissions analyzer or the I/O may, in accord with one aspect of this invention, correspond to a commercially available PCMCIA interface or scan tool, connected to the powertrain controller through link 18 which may take the form of a conventional serial data link having a data link connector, such as a S.A.E. specified J1969 connector in a vehicle passenger compartment for connecting the analyzer 16 with the controller 12. The I/O 26 may, in one embodiment of this invention, be implemented as circuitry within a single module that includes all of the functionality of emissions analyzer 16 of FIG. 1. Integrated circuits that can be used to help implement the functionality of the I/O 26 include the commercially available Motorola 68HC(7)05V8 and the Siliconix SI9243. Such an analyzer thus is portable between vehicles of a variety of models and manufacturers having such a standard connector as the J1969 connector.

Communication between the powertrain controller 12 and the emissions analyzer 16 may be carried out via conventional two-way communication bus 18, which, for example, may be a bi-directional serial data link set up to communicate at 10.4 Kb/s in the manner described in S.A.E. standard J1850 or ISO standard 9141-2. Data passed from the powertrain controller 12 along the link 18 to the emissions analyzer 16 is passed to the I/O unit 26 thereof. Optionally, the emissions analyzer 16 may have a display unit 28 connected through the I/O unit thereof, which may be a data display suitable to be placed in a location visible to the operator of the engine, such as on the instrument panel of a vehicle in which the engine 10 is situated. Information relevant for vehicle emissions estimation is logged (stored) in the NVRAM device 24 of the analyzer 16 and, upon request, is downloaded through the I/O unit 26 to the external analyzer 30 for further processing, to be described. The external analyzer may include its own storage and display means of a conventional type for retaining and issuing of vehicle emissions information. The external analyzer may include means for receiving the downloaded data, for passing the data through a model developed to estimate emissions over a test period, and for communicating or displaying the emissions estimate. The inventors envision that such an external analyzer may be applied to monitor or regulate discretionary operator behavior that impacts engine emissions.

Figure 2:
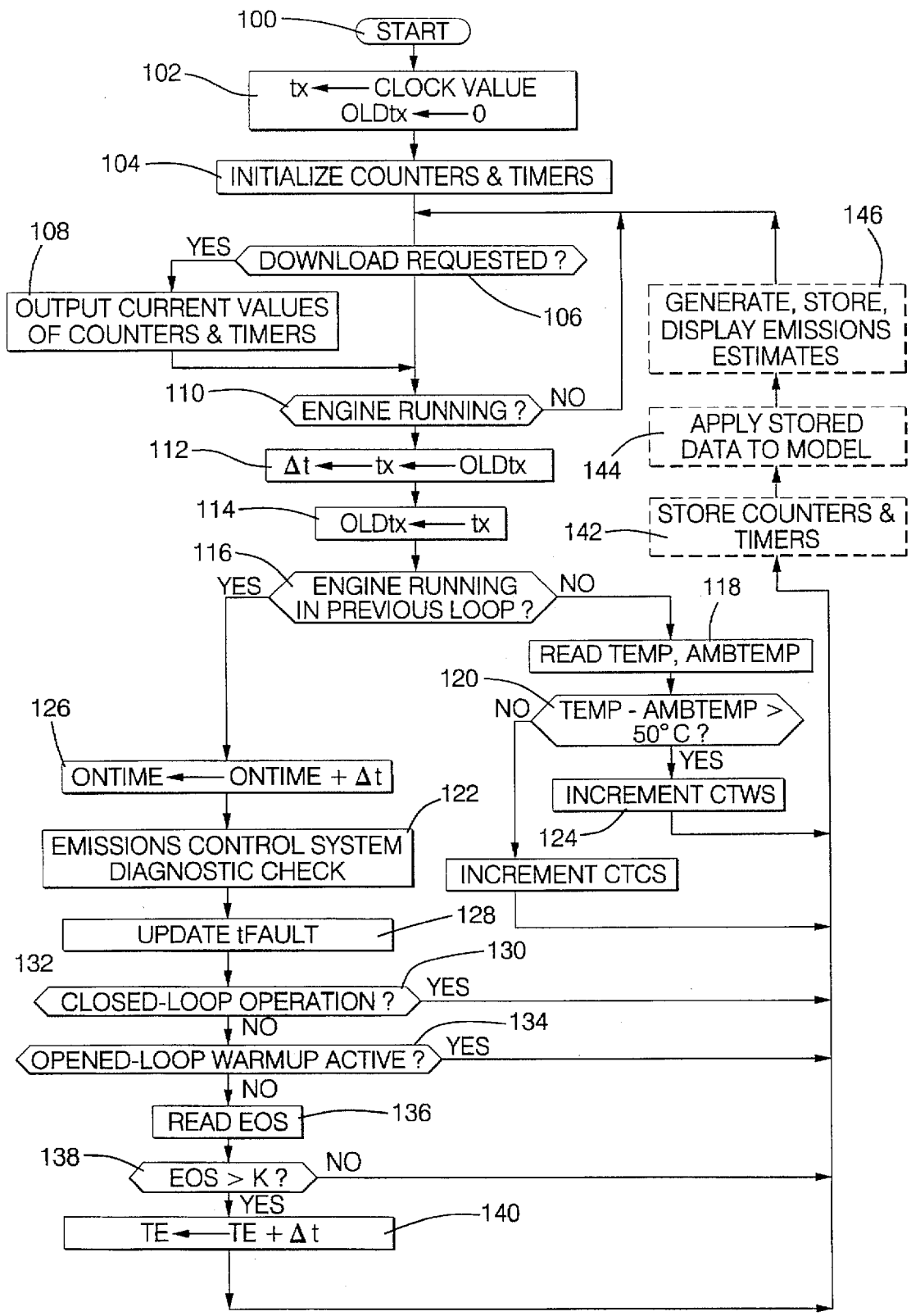
FIGS. 2–3 are computer flow diagrams illustrating a flow of operations for carrying out the emissions analysis of this invention using the hardware of FIG. 1.

Referring to FIG. 2, a flow of operations of the emissions analyzer 16 is provided which are carried out by the analyzer upon application of power thereto, such as upon connecting the analyzer to the link 18 of FIG. 1, which link may include among its various signals, a power signal suited for electrically driving the analyzer so that the analyzer may be conveniently operated from the passenger compartment of the vehicle without an external power supply. When power is applied to the analyzer 16, the processor 20 thereof begins operations, following standard housekeeping and maintenance operations, at a step 100 and proceeds to store a current value of a processor clock indicating current time (relative or real time) into storage location labeled tx and to clear storage location OLDtx, all at a step 102. A plurality of counters and timers, to be described, are next initialized to zero at a step 104. A check is made at a next step 106 to determine if a download request has been received and is pending in the I/O unit 26 from the external analyzer 30. If such a request is pending, current information from the counters and timers is output through the I/O unit 26 to the external analyzer 30 at a next step 108. Next, or following such download, a check is made of whether the engine is running at a step 110. Information indicating whether the engine is running is provided across link 18, for example in the form of standard information shared on the link as described in S.A.E. standard J1979, such as information on engine speed, intake manifold pressure, etc. which may clearly indicate a running engine. If the engine is not determined to be running based on information passed along the link 18, the described steps of the routine, beginning at the step 106 are repeated. The emissions analysis of this embodiment is not carried out until the engine is running and generating estimatable emissions.

Returning to the step 110, if the engine is determined to be running, a time value $\Delta t$ is determined and stored as a difference between tx and OLDtx at a step 112. A check is then made at a next step 116 to determine if the engine was running in the last iteration of the routine of FIG. 2. If the engine was not running, then the current iteration of the routine of FIG. 2 is a startup iteration, and a determination of the type of startup is made at the steps 118–124. First, input signals TEMP and AMBTEMP, as are available on the link 18 are read at a step 118. If the difference between TEMP and AMBTEMP exceeds a predetermined threshold, such as fifty degrees Celsius at a step 120, then it is assumed the startup was a warm start, and a warmstart counter is incremented at a next step 122. Otherwise, a coldstart counter is incremented at a next step 124. Following the steps 122 or 124, a step 142 is carried out, to be described.

Returning to step 116, if the previous iteration of the routine of FIG. 2 is determined to not be a startup iteration, then a stored timer value ONTIME is increased by the value of $\Delta t$ at a step 126 to indicate the amount of time the engine is running. An emissions control system diagnostic check is next made at a step 128 to determine the fault status of all relevant emissions control systems. The diagnostic check, in accord with one embodiment of this invention, interrogates the link 18 to determined if a request to illuminate a warning lamp on a vehicle instrument panel has been made. In accord with another embodiment within this invention, the check interrogates the link 18 to determine a degree of severity of any current fault condition in any emissions control system of the vehicle. The time duration of any fault condition and type of warning issued for the fault condition, to the extent such information is available on the link 18 may be used to determined fault severity at the step 128. In accord with yet a further aspect of this invention, the check interrogates the link 18 in a manner and to the extent necessary to establish the specific emissions control system or sub-system experiencing the fault condition.

After establishing information on any current diagnosed fault condition at the step 128, a timer TFAULT is updated at a step 130 by an amount $\Delta t$ if a fault condition is diagnosed. Alternatively, TFAULT may be incremented by the product of $\Delta t$ and a factor that increases as the fault condition becomes more severe. Further, if it is determined that a critical emissions control system is faulty, TFAULT may be increased further.

After updating TFAULT at the step 130, a check is made by interrogating information passed across link 18 as to whether the fuel control of the powertrain controller 12 is in closed-loop mode of operation in which fueling commands are generated or corrected in response to an actual air/fuel ratio indication provided by the described signal EOS from an engine exhaust gas oxygen sensor (not shown), as is well-established in the art. Closed-loop operation is provided under normal engine control operations for driving engine air/fuel ratio toward the stoichiometric ratio for desirable exhaust gas treatment efficiency by a conventional catalytic treatment device.

If closed-loop operation is active, as may be indicated by information conventionally passed across the link 18, a step 142, to be described is carried out. Otherwise, it is next determined whether the reason for no closed-loop operation is that the engine is just warming up following a startup. Generally, prior to completion of oxygen sensor warm-up and perhaps catalyst light-off in a catalytic treatment device, closed-loop operations will not be carried out. If such is currently the reason for no closed-loop operations, then the step 142 is carried out. Otherwise, the output signal EOS of the oxygen sensor is read at a step 136 and is compared, at a next step 138, to a calibrated threshold level K. In this embodiment in which EOS signal information is provided across link 18 and has a range of about zero to two hundred as the oxygen sensor varies in its range of zero to 1.275 volts, K is set to 75% of that range or about 150. If EOS exceeds 75% of its range at the step 138, then the engine is running rich of stoichiometric indicating, along with the conditions of steps 132 and 134, that an enrichment mode is currently active, such as an open-loop mode of engine control in which the air/fuel ratio is driven rich of stoichiometric, for example to avoid a catalytic converter overtemperature condition. To account for such modes of operation during an iteration of the routine of FIG. 2 in which enrichment is active, the timer TE, indicating an iteration of the routine of FIG. 2 in which enrichment was active, is increased by $\Delta t$ at a next step 140. Following the step 140, a step 142 is executed to store the current value of the counters and timers in non-volatile memory NVRAM 24 (FIG. 1). Optionally, the stored information may next be applied to a stored emissions model, including a model of the impact of the current value of TFAULT on vehicle emissions, such as corresponding to the models used by the external analyzer 30 through the steps of FIG. 3. Emissions information may be yielded at a next step 146 through application of the stored values of the counters and timers to the model(s) at the step 144, which emissions information may be stored and/or displayed in a real time format, such as in the display format described in the U.S. Pat. No. 5,431,042, assigned to the assignee of this application, and corrected to account for any fault condition in the emissions control systems of the vehicle in accord with this invention. After the step 146, or if the engine was determined to not be running at the step 110, the emissions analysis operations of FIG. 2 are repeated, beginning at the step 106. The operations illustrated in FIG. 2 do not describe "wait states", but these are generally understood in the art as necessary to allow the powertrain controller 12 (FIG. 1) to perform its primary functions and are intended to be included inherently in the flow of controller operations of FIG. 2. The time in the wait states is selected as large enough that the powertrain controller 12 does not devote an excessive portion of its time to communications with emissions analyzer 16, yet small enough that the collected data can be used to accurately estimate cumulative vehicle emissions.

Figure 3:
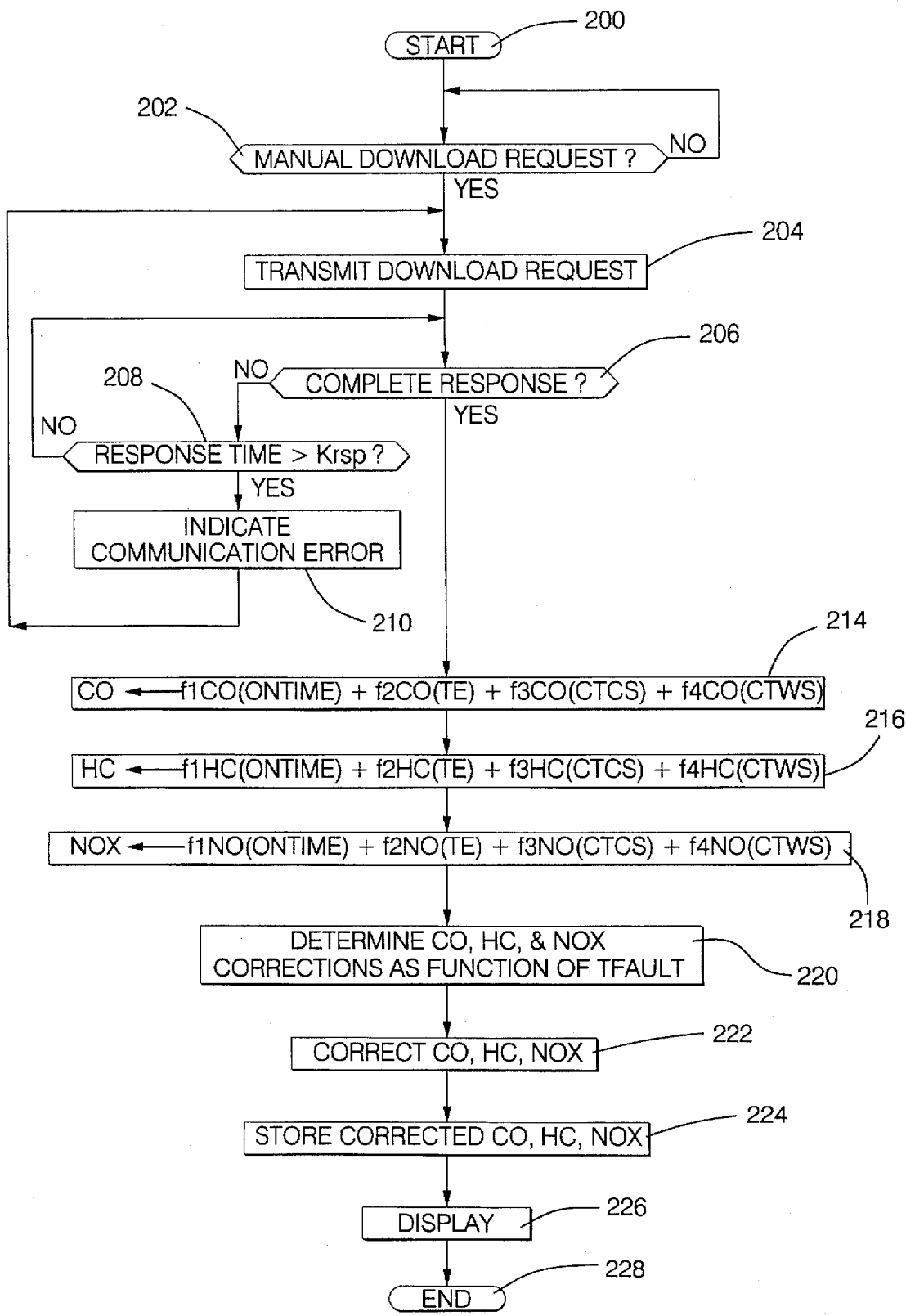

Referring to FIG. 3, a flow of operations of an external analyzer 30 (FIG. 1) is provided indicating the interaction of the external analyzer 30 with the emissions analyzer 16 in accord with this embodiment of the invention. Generally, the external analyzer may be any off-board device for receiving logged (stored) emissions estimation information in the form of the counters and timers of FIG. 2 or indeed in the form of actual emissions estimates and for providing any further processing, storing and displaying that may be desired. Correction of the emissions estimate information may be provided by the external analyzer, as is described in FIG. 3.

Specifically, upon application of power to the external analyzer, a processor therein, of any conventional type, begins, following general housekeeping and maintenance operations which may include operations to identify the vehicle currently being communicated with to assure application of an accurate emissions model for analyzing data downloaded from such vehicle through the operations of the routine of FIG. 3 (not shown), at a step 200 (FIG. 3) and proceeds to determine if the operator of the analyzer 30 has requested a download of information from the emissions analyzer 16 on such vehicle to which the external analyzer is interfaced. The interface may be of any standard type, such as a bi-directional serial data link set up to communicate at 10.4 Kb/s as described in S.A.E. standard J1850 or ISO standard 9141-2. The operations of FIG. 3 remain at the step 202 until such a download request is made. Once such a request is made, a download request is transmitted to the emissions analyzer requesting the most current stored counter and timer information from the memory devices of the analyzer 16. As described in FIG. 2, a download is then initiated at a step 108 of FIG. 2. A determination is made at a next step 206 of FIG. 3 of whether a complete response to the download request has been returned. If not, the time required to complete the response is next compared to a calibrated time limit Krsp at a step 208. If the response time exceeds Krsp, a communication error is assumed to be present between the emissions analyzer 16 and the external analyzer 30 and is indicated at a next step 210, after which another download request is transmitted to the emissions analyzer at the step 204. The operations of FIG. 3 continue in this manner until a complete response is received from the emissions analyzer. The communication error may be indicated in any conventional form, such as through an audible and/or a visual alert to the operator of the external analyzer 30 so that any desired action to correct or overcome the communication error may be taken.

Once a complete response is determined to have been received at the step 206, emissions estimates are generated and corrected at the steps 214–222 as a function of the counter and timer information downloaded from the emissions analyzer 16. Specifically, an estimate of the quantity of carbon monoxide CO emitted by the vehicle over the period of time during which the counter and timer information was logged is estimated at a step 214 as follows:

$$CO = f1CO(ONTIME) + f2CO(TE) + f3CO(CTCS) + f4CO(CTWS)$$

in which the function f1CO( ) maps the engine on time indicated by the timer ONTIME into an estimate of CO. f1CO( ) may be generated by monitoring the level of CO emissions per unit time of normal operation of the engine 10 of this embodiment. The function f2CO( ) maps the time in enrichment as indicated by timer TE into an estimate of CO, and may be generated by measuring the CO emissions quantity per unit time of operation of the engine 10 of this embodiment while such engine is operated in enrichment mode or a like operating mode.

The function f3CO( ) maps the counted number of cold starts indicate by counter CTCS into an estimate of CO, and may be determined by measuring the increase in CO over normal CO levels during a single representative cold start, up to the time the engine returns to CO emission levels corresponding to a fully warmed up functional emissions control system. The function f3CO( ) should be developed with consideration to the function f1CO( ) in that when combined, the two should model the total emissions behavior for an engine operating cycle that began with a cold start.

The function f4CO( ) maps the counted number of warm starts indicated by counter CTWS into an estimate of CO, and may be determined by measuring the increase in CO over normal CO levels during a single representative warm start and up to the time at which the engine returns to emissions levels corresponding to a fully warmed up functional emissions control system. As was the case for f3CO( ), the function f4CO( ) should be developed with consideration to the function f1CO( ), in that when combined, f4CO( ) and f1CO( ) represent generally the total engine emissions for an engine operating cycle that began with a warm start.

The four functions f1CO( ), f2CO( ), f3CO( ), and f4CO( ) may reflect a statistical relationship between the counted events and emissions estimates rather than a deterministic relationship. For example, a multiplicitive coefficient could be applied to each of the timer values or event counts to derive an emissions estimate, wherein the coefficients are provided from publicly available models of vehicle emissions behavior. The models may apply to a specific engine or vehicle or to an entire class of engines or vehicles. A preferred model in this embodiment is the generally-available California EMFAC model, which may be used to transform the timer values or the counted events into emissions estimates.

After generating the CO estimate for an operating system assumed to have a properly functioning emissions control systems at the step 214, an estimate of hydrocarbons HC is generated at a step 216 as follows:

$$HC=f1HC(ONTIME)+f2HC(TE)+f3HC(CTCS)+f4HC(CTWS)$$

in which the four functions f1HC( ), f2HC( ), f3HC( ), and f4HC( ) are generated by mapping the four downloaded values ONTIME, TE, CTCS, and CTWS respectively, into estimates of how such events may each have contributed to the total HC emissions level for the engine 10 of this embodiment. Such four functions may reflect a statistical rather than a deterministic relationship between the downloaded values and the emissions estimates, such as in the manner previously described for the CO estimate.

Following the estimate of HC, the quantity of oxides of nitrogen NOx released during the period of time in which the downloaded values were logged is estimated at a next step 218 as follows:

$$NOx=f1NO(ONTIME)+f2NO(CTCS)+f3NO(CTWS)$$

in which the three functions f1NO( ), f2NO( ), and f3NO( ), which map the values ONTIME, CTCS, and CTWS, respectively, into three estimates of how such logged values impact NOx emissions for the engine 10 of this embodiment.

The time in enrichment TE was determined to not significantly impact emission levels of NOx in this embodiment, and thus was not included in the estimation of step 120. The three functions f1NO( ), f2NO( ), and f3NO( ) may reflect a statistical rather than a deterministic relationship between the corresponding downloaded values of ONTIME, CTCS, and CTWS and the NOx estimate, such as in the manner described above for the CO estimate. As described, other counter or timer values representing information on engine emissions impacting events may be included in alternative embodiments within the scope of this invention to improve the emissions estimates yielded through this invention. The four values of this embodiment were selected as they each contribute significantly to engine emissions and the logging of such events requires no additional sensing or processing hardware on the engine 10 (FIG. 1), on the powertrain controller 12, or on the emissions analyzer 16. The inventors further intend that the functions used to transform the downloaded values into emissions estimates may vary with time, number of events, or vehicle mileage, and may be periodically updated by authorized personnel, for example to reflect improvements in public models. Such variation in the functions may attempt to model the evolving performance of the engine 10 (FIG. 1) or of the emissions control system, to properly characterize any changes in the relationship between the downloaded values and the emissions levels estimated as a function thereof.

Returning to FIG. 3, after generating the three estimates at the steps 214–218, corrections to the estimated values of CO, HC, and NOx are referenced or calculated at a next step 220 as a function of the downloaded value TFAULT representing the degree of increase in the estimated values of CO, HC, and NOx expected to be associated with the current value of TFAULT. Such corrections may be determined as follows. Through off-line experimentation or calibration procedures, values CO', HC', and NOx' may be determined and stored as the average quantity of emissions of a faulty vehicle. A faulty vehicle may, in one example, be a vehicle having an illuminated diagnostic indicator. Such values may be broken down as follows:

$$CO'=f1CO'(ONTIME)+f2CO'(TE)+f3CO'(CTCS)+f4CO'(CTWS)$$

and similarly for HC' and NOx'. A function gNM, in which the "N" is 1, 2, 3, or 4, and the "M" is CO, HC, or NOx may then be defined as follows:

$$gNM=(TFAULT/ONTIME)(fNM'-fNM).$$

The corrections may then be labeled ΔM with the M as defined above, and may be described as $$\Delta M=g1M(ONTIME)+g2M(TE)+g3M(CTCS)+g4M(CTWS).$$

Determination of such corrections then simply requires referencing of the experimentally determined or calibrated values CO', HC', and NOx', calculating of the gNM values using the values of TFAULT, ONTIME and fNM and the referenced values, and calculation of the ΔM values.

More generally, a plurality of individual timers may be provided that account for the effect of emissions control system faults on CO, HC, and NOx emissions. Each of the plurality of timers may be increased by the emissions analyzer 16 of FIG. 1 in accord with the type and severity of any diagnosed fault condition and the impact thereof on CO, HC, and NOx levels. Experimentally determined relationships can be used to estimate the change in the cumulative emissions of CO, HC, and NOx, associated with the respective timers away from normal emissions levels in the presence of the indicated fault condition having the indicated severity. Alternatively, the relationship between the emissions of a class of normally functioning vehicles and the emissions of the same class of malfunctioning vehicles that is contained in a public model may be used to estimate one or more of ΔCO, ΔHC, or ΔNOx.

After determining the corrections, such corrections are applied to the emissions estimates, such as through an additive procedure, to arrive at corrected emissions estimated for the degree of effectiveness of the emissions control systems of the vehicle. The corrected estimates are stored in NVRAM of the external analyzer at a next step 224 and are visually displayed, summarized for review and/or printed out at a next step 226, after which the operations of the external analyzer 30 are concluded at a step 228. Such operations may resume through a manual restart by the external analyzer operator to provide for downloading and processing of additional vehicle emissions information.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A vehicle emissions estimating method for indicating emissions of an automotive vehicle having a plurality of emissions control systems, comprising the steps of:
   storing a model representing a relationship between emissions control system fault conditions and corresponding variation in vehicle emissions away from a base level of vehicle emissions;
   diagnosing an emissions control system fault condition;
   referencing the vehicle emissions variation corresponding to the diagnosed emissions control system fault condition from the stored model;
   periodically during a test period, determining an occurrence of any of a predetermined set of engine events;
   estimating a level of vehicle emissions as a predetermined function of the determined occurrences;
   applying the referenced vehicle emissions variation to the estimated level of vehicle emissions to form a corrected vehicle emissions estimate; and
   indicating the corrected vehicle emissions estimate.

2. The method of claim 1, wherein the emissions control systems include catalyst treatment systems for catalytically treating engine exhaust gas, air/fuel ratio control systems for driving engine air/fuel ratio toward a target air/fuel ratio, exhaust gas recirculation systems for recirculating a portion of engine exhaust gas to an engine intake, and misfire detection systems for diagnosing improper combustion conditions in the engine.

3. The method of claim 1, wherein the diagnosed fault condition includes fault conditions in an emissions control system that normally result in an increase in vehicle emissions.

4. The method of claim 1, wherein the base level of vehicle emissions is the level of vehicle emissions estimated at the estimating step.

5. The method of claim 1, wherein the stored model comprises, for each of the plurality of emissions control systems, at least one corresponding emissions variation indicating the variation in vehicle emissions away from a base level of vehicle emissions when a fault condition is diagnosed in the corresponding emissions control system;
   the method further comprising the step of distinguishing, when an emissions control system fault condition is diagnosed, the one of the plurality of emissions control systems experiencing the diagnosed fault condition;
   and wherein the referencing step references an emissions variation corresponding to the one of the plurality experiencing the diagnosed fault condition.

6. The method of claim 1, wherein the stored model comprises, for each of the plurality of emissions control systems, a schedule of correction values stored as a function of a fault severity value indicating the variation in vehicle emissions away from a base level of vehicle emissions when a fault condition is diagnosed in the corresponding emissions control system having a severity corresponding to the fault severity value;
   the method further comprising the steps of:
   distinguishing, when an emissions control system fault condition is diagnosed, the one of the plurality of emissions control systems experiencing the diagnosed fault condition;
   determining a fault severity value representing the degree that the diagnosed fault condition impacts vehicle emissions; and
   referencing, from the stored schedule corresponding to the one of the emissions control systems experiencing the diagnosed fault condition, the correction value stored as a function of the determined fault severity value, and wherein the applying step applies the referenced correction value to the estimated level of vehicle emissions to form a corrected vehicle emissions estimate.

7. The method of claim 1, further comprising the steps of:
   sensing a download request; and
   transmitting the determined occurrences and the diagnosed fault condition to an external analyzer upon sensing the download request.

8. The method of claim 7, wherein the transmitting step transmits the determined occurrences, the diagnosed fault condition, and the corrected vehicle emissions estimate upon sensing the download request.

9. The method of claim 1, wherein the stored model represents a relationship between emissions control systems fault conditions and corresponding variation in each of at least the vehicle emissions elements of carbon monoxide (CO), hydrocarbons (HC), and oxides of nitrogen (NOx) away from a base level of such emissions elements, and wherein the estimating step estimates a level of at least the vehicle emissions elements of CO, HC, and NOx as a predetermined function of the determined occurrences.

10. A method for indicating an estimate of the emissions of an automotive vehicle having a plurality of emissions control systems, comprising the steps of:
    storing an emissions model representing vehicle emissions as a function of a predetermined set of vehicle operating parameter values;
    storing a schedule of model correction values as a function of a series of emissions control system fault conditions;
    logging values of the predetermined set of vehicle operating parameters over a test period;
    generating a base vehicle emissions estimate by applying the logged values to the stored emissions model;
    diagnosing emissions control system fault conditions over the test period;
    applying a diagnosed emissions control system fault condition to the stored schedule to reference a model correction value;
    correcting the base vehicle emissions estimate by applying the referenced model correction value to the base vehicle emissions estimate; and
    indicating the corrected base vehicle emissions estimate.

11. The method of claim 10, wherein the stored schedule comprises, for each of the plurality of emissions control systems, a series of correction values stored as a function of a degree of deterioration of the corresponding one of the plurality of emissions control systems, the method further comprising, for a diagnosed emissions control system fault condition, the steps of:

identifying the one of the plurality of emissions control systems corresponding to the diagnosed emissions control system fault condition; and estimating a degree of deterioration of the identified one of the plurality; and wherein the applying step applies the estimated degree of deterioration to the series of correction values corresponding to the identified one of the plurality to reference the correction value corresponding thereto.

12. The method of claim 10, further comprising the steps of:

detecting a download request; and downloading the logged values and the diagnosed emissions control system fault conditions to an external device upon detecting the download request.

13. The method of claim 10, further comprising the steps of:

detecting a download request; and downloading the logged values, the diagnosed emissions control system fault conditions, and the corrected base vehicle emissions estimate to an external device upon detecting the download request.

\* \* \* \* \*